_(12)_ United States Patent     (10) Patent No.:    US 8,341,301 B2
Strulovici et al.                                 (45) Date of Patent:      Dec. 25, 2012

(54) DEVICE AND METHOD FOR TESTING A DIRECT MEMORY ACCESS CONTROLLER

(75) Inventors: Ilan Strulovici, Kiryat Motzkin (IL); Erez Arbel-Meirovich, Yahud (IL); Amit Rossler, Petach-Tikva (IL)

(73) Assignee: Freescale Semiconductor, Inc., Austin, TX (US)

( * ) Notice: Subject to any disclaimer, the term of this patent is extended or adjusted under 35 U.S.C. 154(b) by 355 days.

(21) Appl. No.: 12/521,838

(22) PCT Filed: Jan. 2, 2007

(86) PCT No.: PCT/IB2007/050002
§ 371 (c)(1), (2), (4) Date: Jun. 30, 2009

(87) PCT Pub. No.: WO2008/081346
PCT Pub. Date: Jul. 10, 2008

(65) Prior Publication Data
US 2010/0036976 A1    Feb. 11, 2010

(51) Int. Cl.
*G06F 3/00*           (2006.01)

(52) U.S. Cl. ........... 710/7; 710/5; 710/6; 710/8; 710/20; 710/22; 710/23; 710/24; 710/27; 710/33; 710/49

(58) Field of Classification Search ................. 710/5, 6, 710/7, 8, 20, 22, 23, 24, 27, 33, 49
See application file for complete search history.

(56) References Cited

U.S. PATENT DOCUMENTS

| 5,423,029 | A | 6/1995 | Schieve |
| 6,055,619 | A * | 4/2000 | North et al. ............... 712/36 |
| 6,453,367 | B2 | 9/2002 | Barry |
| 6,747,426 | B2 * | 6/2004 | Katsu et al. ........... 318/400.12 |
| 7,500,046 | B1 * | 3/2009 | Puri et al. ................. 710/311 |
| 7,676,709 | B2 * | 3/2010 | Chan ........................ 714/719 |
| 7,958,412 | B2 * | 6/2011 | Jeddeloh .................. 714/718 |
| 2001/0013076 | A1 * | 8/2001 | Yamamoto ................. 710/33 |
| 2004/0216018 | A1 | 10/2004 | Cheung |
| 2006/0010264 | A1 * | 1/2006 | Rader et al. ................ 710/23 |

FOREIGN PATENT DOCUMENTS

GB          2338791 A      12/1999

OTHER PUBLICATIONS

International Search Report for PCT Application No. PCT/IB2007/05002 issued Sep. 7, 2007.

* cited by examiner

*Primary Examiner* — Chun-Kuan Lee
*Assistant Examiner* — Jasjit Vidwan

(57) ABSTRACT

A device and a method for testing a DMA controller. The device includes: (i) a DMA controller that includes a first data transfer path and a second data transfer path, wherein the first data transfer path and the second data transfer path are mutually independent; (ii) a test unit, connected to the first and second data transfer paths, that is adapted to control a transfer of data between the first data transfer path and the second data transfer path during a test mode, while masking from a first memory unit coupled to the DMA controller, at least one control signal associated with the transfer of data.

6 Claims, 3 Drawing Sheets

DEVICE AND METHOD FOR TESTING A DIRECT MEMORY ACCESS CONTROLLER

FIELD OF THE INVENTION

The present invention relates to devices and methods for testing a direct memory access (DMA) controller.

BACKGROUND OF THE INVENTION

Data processing systems have one or more buses that function as a communication highway for the system. The one or more buses function to transfer address, data and/or control information during time periods defined by clock cycles.

Typical data processing systems use a technique known as a direct memory access (DMA). Using direct memory access, information can be directly transferred between input/output devices and a memory with only minimal involvement by a central processing-unit (CPU). Thus a DMA controller functions to transfer a stream of information from a source in a data processing system to a destination.

The complexity of DMA controllers as well as their speed has dramatically increased during the last decades. Testing DMA controllers can be a long and tedious process that requires multiple dedicated test pins.

There is a growing need to simplify the testing of DMA controllers.

SUMMARY OF THE PRESENT INVENTION

A device and a method for testing a direct memory access controller, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

A device and method are provided. A DMA controller includes at least two independently controlled data transfer paths. The DMA controller can be tested during a test mode by allowing data to be transferred from one data transfer path to the other data transfer path while masking one or more control signal generated by the DMA controller.

The DMA controller test involves: (i) sending a read command to the first data transfer path, (ii) sending a write command to the second data transfer path, (iii) virtually connecting the output of the first data transfer path to the input of the second data transfer path, (iv) sending control signals that facilitate the data transfer, and (v) mask control signals from one or more unit that is not intended to participate in the data transfer.

Figure 1:
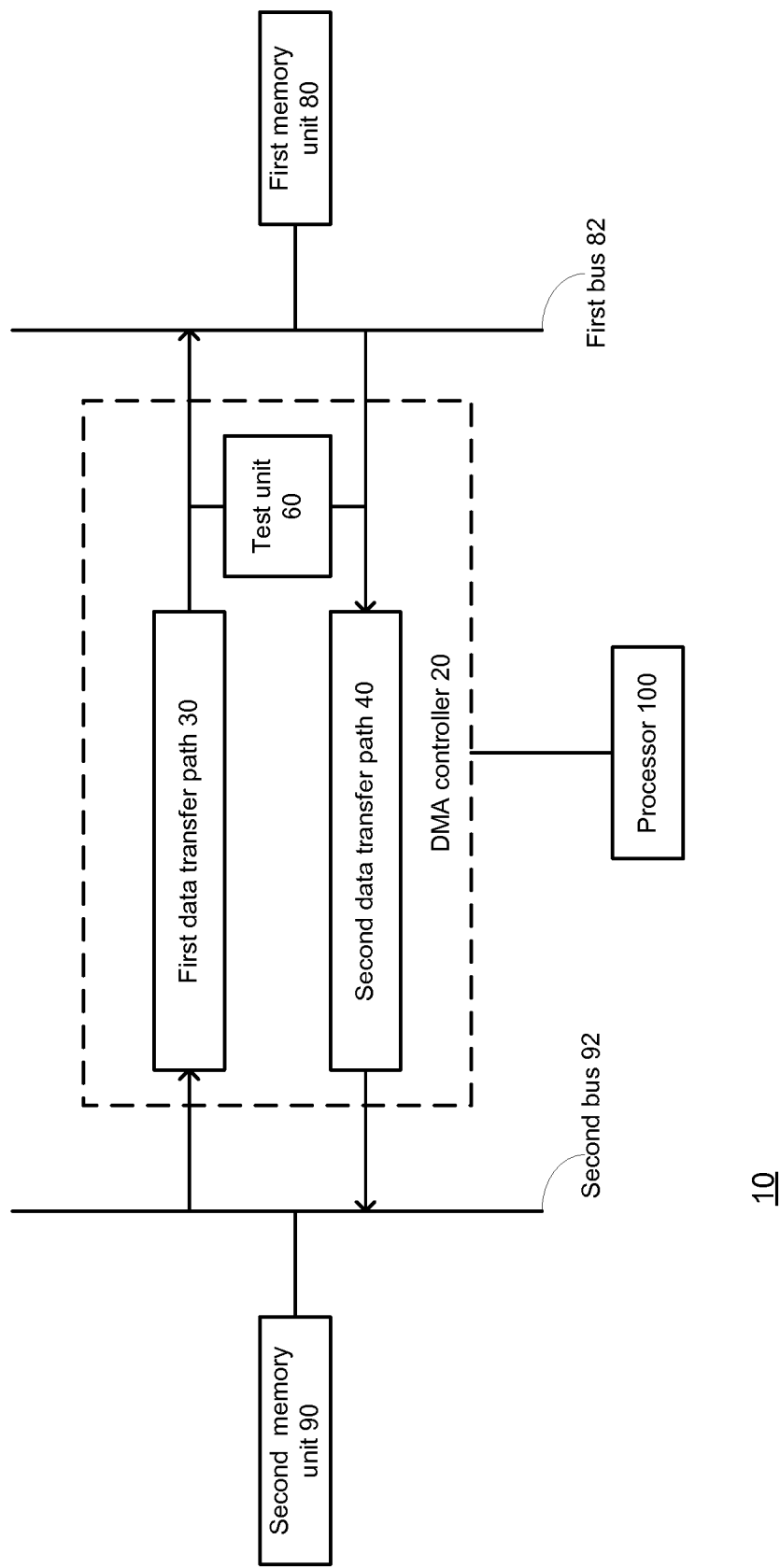
FIG. 1 illustrates a device having DMA controller testing capabilities according to an embodiment of the invention.

FIG. 1 illustrates device 10 having DMA controller testing capabilities, according to an embodiment of the invention.

Device 10 can be an integrated circuit, multiple integrated circuits, can include one or more integrated circuits, can be a mobile phone, a communication controller, a personal data accessory, a media player, a laptop computer, a desktop computer, a game, an electronic book and the like.

Device 10 includes DMA controller 20, test unit 60, first memory unit 80, second memory unit 90 and processor 100.

DMA controller 20 includes first data transfer path 30 and second data transfer path 40. The first data transfer path 30 and the second data transfer path 40 are mutually independent. Conveniently, each data transfer path can receive dedicated commands or control signals.

During an operational mode (which differs from a test mode) processor 100 sends read commands and, alternatively or additionally, write commands to one or more data transfer paths of DMA controller 20. DMA controller 20 responds by transferring data from a source unit to a destination unit. The source unit as well as the destination unit can be first memory unit 80, second memory unit 90, or another memory mapped component (such as but not limited to a peripheral).

Device 10 also includes test unit 60. Test unit 60 is connected to first data transfer path 30 and to second data transfer path 40. Test unit 60 controls a transfer of data between first data transfer path 30 and between second data transfer path 40 during a test mode, while masking (from first memory unit 80) at least one control signal associated with the transfer of data.

Conveniently, test unit 60 masks the data transfer from units outside DMA controller 20 while allowing data to be internally transferred (via test unit 60) from one data transfer path of DMA controller 20 to the other. Typically, one or more buses, bridges or interconnects are connected between DMA controller 20, first memory unit 80 and additional units. For simplicity of explanation, FIG. 1 illustrates two buses—(i) first bus 82 that is connected between DMA controller 20 and first memory unit 80 and (ii) second bus 92 that connects between DMA controller 20 and second memory unit 90.

By masking control signals from at least first memory unit 80, first memory unit 80 can be accessed during the DMA controller test, without being affected from that test.

Conveniently, during an operational mode test unit 60 is transparent and does not affect data transfers.

According to an embodiment of the invention test unit 60 can be informed (updated) about the required mode (test mode, operational mode) by a test mode indicator. The test mode indicator is conveniently provided by processor 100. Typically, the test mode indicator is written to a register of device 10. The According to an embodiment of the invention the DMA controller test requires that one data transfer path will execute a read command while the other data transfer path executes a write command. These commands can be sent from processor 100 in a manner that will guarantee that the read command and the write command are be executed substantially concurrently by the two data transfer paths. Conveniently, if the data transfer paths have a buffer, the status of these buffers can be taken into account when these read and write commands are sent to the data transfer paths.

Conveniently, a typical DMA controller test will include the following stages: (i) fetching data from second memory unit 90, (ii) providing the data to first data transfer path 30 (or to second data transfer path 40), (iii) sending the data, via test unit 60, to second data transfer path 40, and (iv) sending the data to second memory unit 90. The data can be sent to the same address range (within second memory unit 90) from which it was retrieved, but this is not necessarily so.

Conveniently, second memory data unit 90 is an internal memory unit (can be included at the same integrated circuit as DMA controller 20) while first memory unit 80 is an external memory unit, but this is not necessarily so.

Conveniently, device 10 or another device (such as but not limited to a tester) can monitor the transfer of data (for example—determine whether the data transfer was completed, whether the data transfer was completed within a reasonable time frame, whether the data was not erroneously altered or otherwise corrupted during the data transfer) and evaluate, in response to the monitoring, if DMA controller 20 is functional or not.

According to an embodiment of the invention the test mode can be driven from software, a DMA controller command or from a signal provided via an external pin.

Conveniently, an addition of an internal chip data transfer (for example BCOPY command) can be provided.

Figure 2:
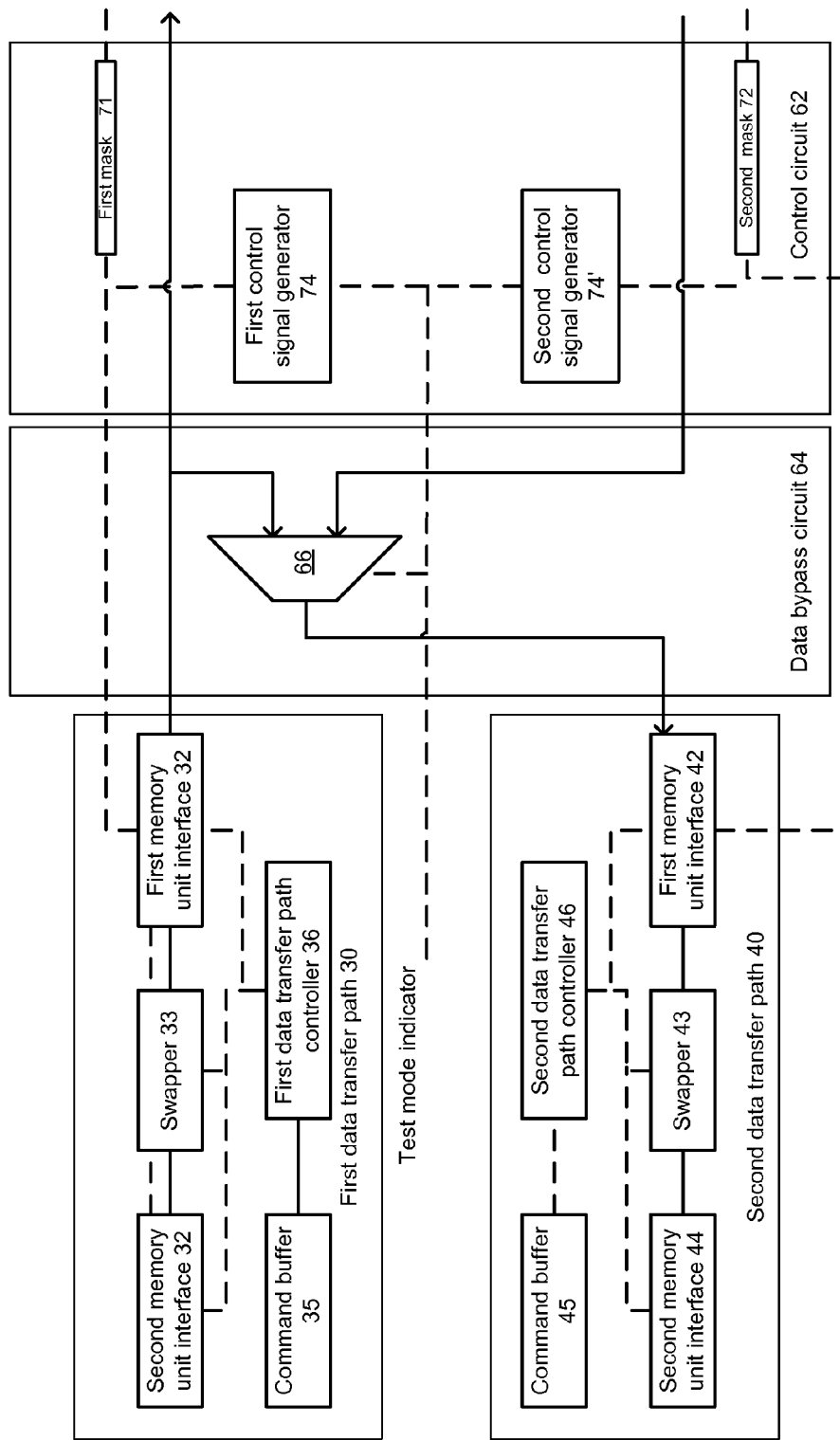
FIG. 2 illustrates a DMA controller and a test unit according to an embodiment of the invention.

FIG. 2 illustrates DMA controller 20 and test unit 60 according to an embodiment of the invention.

First data transfer path 30 includes second memory unit interface 32, swapper 33, first memory unit interface 34, command buffer 35 and first data transfer path controller 36.

First data transfer path controller 36 is able to access command buffer 35 and read write commands and/or read commands. In response to the command that was read first data transfer path controller 36 can then send to other components of first data transfer path 30 the appropriate control signals. Each one of interfaces 32 and 34 can include a data buffer. When a read command is executed data from first memory unit 80 is sent towards second memory unit 90. Data is received by first memory unit interface 34 and then sent to swapper 33.

Data can be transferred over first bus 82 at a first format (alignment, bits order) that differs from a second format that is used by second bus 92. Swapper 33 can perform format conversions (alignment operations, byte swap operations) from one format to the other. Data is sent from swapper 33 to second memory unit interface 32.

When a write command is executed data from second memory unit 90 is sent towards second memory unit 80. Data is received by second memory unit interface 32 and then sent to swapper 33. Swapper 33 can perform format conversions (alignment operations, byte swap operations) from one format to the other. The data is then sent to first memory unit interface 34.

Second data transfer path 40 operates in substantially the same manner as first data transfer path 30 and has the same components. It includes second memory unit interface 42, swapper 43, first memory unit interface 44, command buffer 45 and second data transfer path controller 46.

Test unit 60 includes control circuit 62 and data bypass circuit 64. Control circuit 62 is adapted to generate control signals required for transferring data over data bypass circuit 64. Control circuit 62 is also adapted to mask, from first bus 82, from first memory unit 80 (or other components connected to first bus 82), at least one control signal associated with the transfer of data.

Conveniently, data bypass circuit 64 includes multiplexer 66 that has a first input, a second input and an output. The first input is connected to second data transfer path 40. The second input is connected to first memory unit 80. The output is connected to first data transfer path 30.

During operational mode the second input of multiplexer 66 is selected when data is sent from first memory unit 80 to first data transfer path 30.

During test mode the first input of multiplexer 66 is selected when data is sent from first data transfer path 30 to second data transfer path 40.

Control circuit 62 generates the controls signals that facilitate the transfer of data. These control signals are usually tailored to fit the communication protocol that is being used by circuits that share the bus, bridge or interconnect that connect first memory unit 80 to DMA controller 20.

For example, the inventors used a control circuit that was adapted to receive a read/write signal, a data transfer request signal and in response generate a request acknowledgement signal and a data acknowledge signal. In addition, control circuit 62 receives a data transfer size indicator and in response determine the timing of end of data signal and even end of transfer signal. Conveniently, the request acknowledge signal is generated immediately (for example one clock cycle) after a reception of the data transfer request signal. It is noted the request acknowledgement signal can be generated after a certain (usually a predefined) time gap.

Control circuit 62 is illustrated as including first mask 71, second mask 72, first and second control signal generator 74 and 74'. First mask 71 is connected to a control bus that conveys control signals between first bus 82 and first data transfer path 30. First mask can mask (during test mode) one or more control signals outputted by first data transfer path 30. Second mask 72 is connected to a control bus that conveys control signals between first bus 82 and second data transfer path 40. Second mask 72 can mask (during test mode) one or more control signals outputted by second data transfer path 40.

First control signal generator 74 controls first data transfer path 30 and second control signal generator 74' controls second data transfer path 40. These control signal generators are connected to the control busses that connect first bus 82 to the first data transfer paths and can send control signals to these data transfer paths such as to emulate first bus 82 or other components connected to first bus 82.

Figure 3:
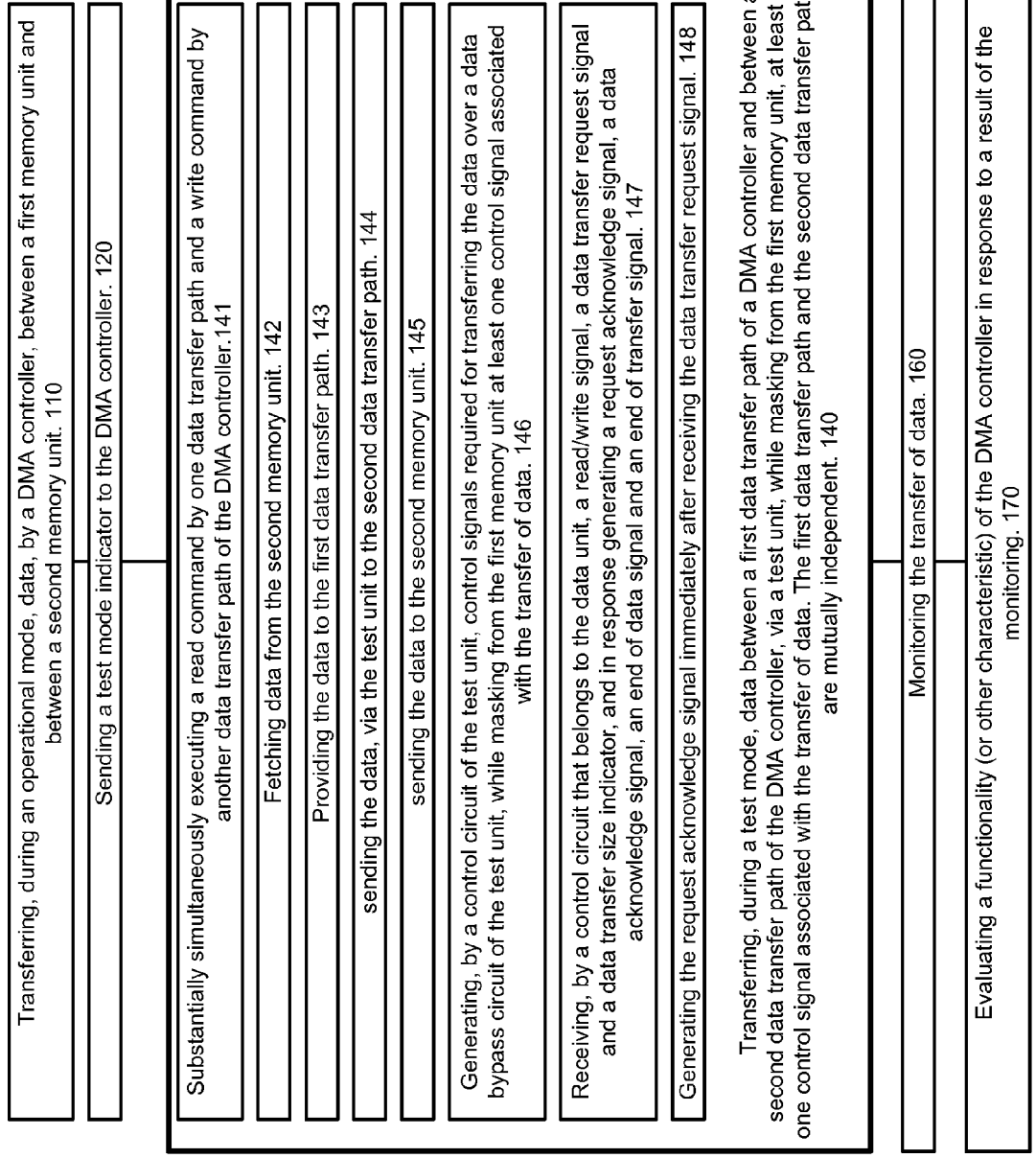
FIG. 3 illustrates a method for testing a direct memory access controller, according to an embodiment of the invention.

FIG. 3 illustrates method 100 for testing a direct memory access DMA controller, according to an embodiment of the invention.

Method 100 starts by stage 110 of transferring, during an operational mode, data, by a DMA controller, between a first memory unit and between a second memory unit.

Stage 110 is followed by optional stage 120 of sending a test mode indicator to the DMA controller. This test mode indicator can be erased, updated, altered or otherwise ignored once the test mode ends.

Stage 120 is followed by stage 140 of transferring, during a test mode, data between a first data transfer path of a DMA controller and between a second data transfer path of the DMA controller, via a test unit, while masking from the first memory unit, at least one control signal associated with the transfer of data. The first data transfer path and the second data transfer path are mutually independent.

Method 100 also includes stage 160 of monitoring the transfer of data. The monitoring can be executed during the execution of stage 140 or even during a portion of the execution of stage 140. The timing of data transfer and/or the timing of the generation of control signals and the response to these control signals can be monitors by manners known in the art.

Stage 160 is followed by stage 170 of evaluating a functionality (or other characteristic) of the DMA controller in response to a result of the monitoring.

It is noted that stages 140-170 can be executed before or after stage 110. It is further notes the multiple iterations of stages 120-160 (or of stages 140-160) can be executed before evaluating the functionality of the DMA controller.

According to various embodiments of the invention stage 140 of transferring comprises at least one of the following operations: (i) stage 141 of substantially simultaneously executing a read command by one data transfer path and a write command by another data transfer path of the DMA controller; (ii) stage 142 of fetching data from the second memory unit, (iii) stage 143 of providing the data to the first data transfer path, (iv) stage 144 of sending the data, via the test unit to the second data transfer path; (v) stage 145 of sending the data to the second memory unit; (vi) stage 146 of generating, by a control circuit of the test unit, control signals required for transferring the data over a data bypass circuit of the test unit, while masking from the first memory unit at least one control signal associated with the transfer of data; (vii) stage 147 of receiving, by a control circuit that belongs to the data unit, a read/write signal, a data transfer request signal and a data transfer size indicator; and in response generating a request acknowledge signal, a data acknowledge signal, an end of data signal and an end of transfer signal; and (viii) stage 148 of generating the request acknowledge signal immediately after receiving the data transfer request signal.

Those of skill in the art will appreciate that various combinations of the mentioned above stages (141-148) can be executed during stage 140.

Referring to the example set fourth in FIG. 1-FIG. 2, stage 140 of transferring can involve using various circuits of test unit 60, including utilizing control circuit 62, data bypass circuit 64 multiplexer 66, and the like.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having direct memory access (DMA) controller testing capabilities, the device comprises:
    a DMA controller, the DMA controller comprises a first data transfer path and a second data transfer path, the first data transfer path and the second data transfer path are mutually independent;
    a test unit coupled to the first and second data transfer paths, the test unit is adapted to control a transfer of data between the first data transfer path and the second data transfer path during a test mode, while masking, from a first memory unit coupled to the DMA controller, at least one control signal associated with the transfer of data; and
    a processor adapted to send to the test unit a test mode indicator and further adapted to send a read command to one data transfer path and a write command to another data transfer path of the DMA controller to be substantially simultaneously executed during the test mode.

2. The device according to claim 1 wherein the device comprises:
    a second memory unit that is coupled to first and second data transfer paths, and wherein the transfer of data comprises fetching data from the second memory unit, providing the data to the first data transfer path, sending the data, via the test unit, to the second data transfer path, and sending the data to the second memory unit.

3. A method for testing a direct memory access (DMA) controller, the method comprises:
    transferring, by the DMA controller during an operational mode, data between a first memory unit and a second memory unit;
    transferring, during a test mode, data between a first data transfer path of the DMA controller and between a second data transfer path of the DMA controller, via a test unit, while masking from the first memory unit at least one control signal associated with the transfer of data; and
    sending, a test mode indicator to the DMA controller, and wherein the transferring comprises substantially simultaneously executing a read command by one data transfer path and a write command by another data transfer path of the DMA controller;
    wherein the first data transfer path and the second data transfer path are mutually independent.

4. The method according to claim 3 wherein the transferring during the test mode comprises:
    fetching data from the second memory unit, providing the data to the first data transfer path, sending the data, via the test unit to the second data transfer path, and sending the data to the second memory unit.

5. The method according to claim 3 wherein the transferring, during a test mode, comprises:
    receiving, by a control circuit that belongs to the data unit, a read/write signal, a data transfer request signal and a data transfer size indicator; and in response generating a request acknowledge signal, a data acknowledge signal, an end of data signal and an end of transfer signal.

6. A method for testing a direct memory access (DMA) controller, the method comprises:
    transferring, by the DMA controller during an operational mode, first data from a first memory unit to a second memory unit via a first data transfer path of the DMA controller and from the second memory unit to the first memory unit via a second data transfer path of the DMA controller; and
    transferring, by the DMA controller during a test mode, second data from first memory unit to a test unit within the DMA controller via the first data transfer path and from the test unit to the first memory unit via the second data transfer path, while masking at least one control signal associated with the transferring of the second data from the second memory unit.

\* \* \* \* \*